(12) United States Patent
Cornell et al.

(10) Patent No.: US 6,171,517 B1
(45) Date of Patent: Jan. 9, 2001

(54) RUBBER COMPOUNDING FORMULATION AND METHOD

(75) Inventors: Robert Joseph Cornell, Prospect; Darilyn Helen Roberts, Waterbury; William Robert True, Wolcott, all of CT (US)

(73) Assignee: Uniroyal Chemical Company, Inc., Middlebury, CT (US)

( * ) Notice: Under 35 U.S.C. 154(b), the term of this patent shall be extended for 0 days.

(21) Appl. No.: 08/192,220

(22) Filed: Feb. 3, 1994

(51) Int. Cl.[7] ................. C08K 5/16; C08K 5/04
(52) U.S. Cl. ................. 252/182.19; 252/182.13; 252/182.26
(58) Field of Search .............. 524/87; 252/182.13, 252/182.18, 182.23, 182.26, 182.28, 182.29

(56) References Cited

U.S. PATENT DOCUMENTS

| | | |
|---|---|---|
| 2,400,500 | 5/1946 | Gibbs . |
| 2,561,524 * | 7/1951 | Massie ................. 525/346 |
| 2,955,100 | 10/1960 | Hill et al. . |
| 3,337,493 * | 8/1967 | New ..................... 524/87 |
| 3,413,253 * | 11/1968 | Kilbourne .............. 524/87 |
| 3,620,742 | 11/1971 | Willems et al. . |
| 4,158,000 | 6/1979 | Nagasaki et al. . |
| 4,247,664 | 1/1981 | Parker . |

FOREIGN PATENT DOCUMENTS

| | | |
|---|---|---|
| 1906126 | 2/1969 | (DE) . |
| 0412832A2 | 2/1991 | (EP) . |
| 0412832A3 | 2/1991 | (EP) . |
| 1616933 | 12/1990 | (SU) . |

* cited by examiner

Primary Examiner—Christopher Henderson
(74) Attorney, Agent, or Firm—Daniel Reitenbach

(57) ABSTRACT

This disclosure is directed to an antioxidant compound which reduces the rate at which insoluble sulfur converts to a migratable form of sulfur in an unvulcanized compound.

4 Claims, No Drawings

RUBBER COMPOUNDING FORMULATION AND METHOD

TECHNICAL FIELD

Our present invention is directed to a formulation for producing a cured elastomeric article. Such a formulation includes insoluble sulfur.

Our invention prevents the conversion of insoluble sulfur to soluble sulfur, soluble sulfur being able to migrate to the surface of the elastomeric article prior to vulcanization.

BACKGROUND ART

It is generally well-known that an atmosphere which contains oxygen can cause surface cracking of conventional unsaturated rubber vulcanizates when subjected to repeated flexing in an oxygen-containing environment. Deterioration has been observed to occur when small "surface" cracks grow rapidly into deep, disruptive fissures. Fissures of this sort can significantly shorten the serviceable life of an elastomeric article made from a rubber vulcanizate.

The ongoing desire to prolong the useful life of elastomeric articles made from rubber—either natural or synthetic—is also well known.

U.S. Pat. No. 4,158,000 to Nagasaki et al., for example, discloses antidegradants for rubber, said to be useful for preventing heat-aging and flex-cracking. A mixture consisting essentially of specified percentages of 2,2,4-trimethyl-1,2-dihydroquinoline monomer, dimer thereof and more-highly-polymerized products are mentioned in the Nagasaki patent as providing rubber with such an antidegradant ingredient.

U.S. Pat. No. 2,400,500 to Gibbs, moreover, discloses various condensation products of 1,2-dihydroquinolines with diarylamines, said to be useful in preventing flex-cracking of rubber. Gibbs mentions in this patent that reacting an alipathic ketone with a primary aromatic amine to produce a 1,2-dihydroquinoline is known.

2,2,4-trimethyl-1,2-dihydroquinoline, a principal product resulting from the reaction of acetone and aniline, is a known useful antioxidant.

Many chemical antidegradants, principally based upon amine chemistry, have in fact been developed to arrest or otherwise delay the physical deterioration of articles made from cured elastomeric materials.

Current formulations for producing cured elastomeric articles typically include an insoluble form of sulfur, which prevents sulfur migration prior to vulcanization. Conversion of the insoluble form of sulfur to its soluble form, which is currently known to result in migration of soluble sulfur to the surface of an uncured rubber article, appears to be caused by the presence of amine-based antidegradants.

While mixtures which include 2,2,4-trimethyl-1,2-dihydroquinoline are known to prolong the useful life of elastomeric articles, which is desirable, the presence of 2,2,4-trimethyl-1,2-dihydroquinoline and its various forms are known to cause insoluble sulfur to convert to a soluble form of sulfur, which is undesirable.

For example, soluble sulfur is known to migrate to the surface of uncured rubber articles. Migration of this sort, called sulfur "bloom," is known to cause loss of "building tack."

The term "building tack" refers to certain adherence properties of uncured elastomeric materials such as rubber, particularly when such materials are produced as relatively-thin sheets and such sheets are thereafter layered and utilized in the fabrication of a tire.

Obtaining undesirable "building-tack" properties, using these sorts of elastomeric materials, can thus become a matter of concern.

OBJECTS OF INVENTION

One object of our present invention, therefore, is to markedly reduce the rate at which an insoluble form of sulfur converts to its soluble form. A related object is to prevent sulfur "bloom." Still another object is to prolong, for extended periods of time, many of the desirable physical properties of cured elastomeric articles. Additional features and advantages of our present invention will become apparent to those skilled in the art upon reading the following specification.

SUMMARY DISCLOSURE

One aspect of our invention is directed to a novel formulation for producing a cured elastomeric article.

Another aspect of our invention concern methods of producing our formulation. Our formulation includes a non-migratable form of sulfur, known as insoluble sulfur.

In reference to the preparation of our novel formulation, we have discovered that select relative amounts of (A) a first reactive ingredient and (B) a second reactive ingredient, when combined in a chemically-reactive environment, can be utilized to produce (C) a reaction product that is effective for reducing the rate at which insoluble sulfur converts to a migratable form of sulfur (soluble sulfur).

The first reactive ingredient (A) is itself a reaction product, resulting from the reactive combining of an aliphatic ketone with a primary aromatic amine. The second reactive ingredient (B) is an acid anhydride.

The two reactive ingredients (A and B) are reactively combined and thus converted to our novel product (C).

We have found that our product (C), because it results from utilizing an amine-based reactant, is able to provide our novel formulation with certain desirable physical properties, such as those otherwise typically provided by an amine-based antidegradant.

Industrial Applicability

Our present invention can be used to make various articles from unsaturated rubber vulcanizates. Such rubber may be natural, synthetic, or a mixture of both.

Some representative examples of unsaturated elastomers commonly used in the composite articles of our present invention include natural rubber, synthetic polyisoprene, polychloroprene, so-called "cyclene" rubbers, norbornene rubbers, polysulfide rubbers, styrene-butadiene rubbers, polybutadiene rubbers, nitrile rubbers, carboxylated nitrile rubbers, butyl rubbers, ethylene-propylene-diene monomer-based ("EPDM") rubbers, epichlorohydrin homopolymers and copolymers, ethylene-propylene rubbers ("EPR"), and polyisobutylene rubbers.

We would currently expect the major commercial use in the near term to be in the areas of tires, conveyor belts, and elastomeric hoses.

In particular, the antidegradant composition of the present invention can be used most advantageously as any component or portion of a tire. Such uses include wire belt or carcass portions of a tire. Such a tire may be a truck tire, a passenger tire, or an off-the-road vehicle tire. Moreover, any such tire may contain many different reinforcing elastomeric layers therein, any such layer embodying different features of our invention. For example, tire components of these sorts typically contain more than one thermosetting rubber polymer in a blend which must be protected from oxidative attack.

Our data presented below demonstrates that the antidegradant compositions of our present invention prevent conversion of insoluble sulfur to its soluble forms. The antidegradant compositions of our present invention also improve oxygen-resistance and heat-aging properties of the elastomeric materials in which our novel compositions are incorporated. Yet, our novel compositions do not cause any noticeable reduction in flexural properties of the elastomeric materials in which they are incorporated.

Also, the novel antidegradant compositions of our present invention are typically solids, which promotes ease-of-use.

BEST MODE FOR CARRYING OUT INVENTION

Typically, the "A" ingredient (i.e., the reaction product of an aliphatic ketone and a primary aromatic amine) and the "B" ingredient (an acid anhydride) are combined in a chemically-reactive environment and are subsequently utilized to produce "C", the novel antidegradant ingredient of our invention.

Also, typically 85 to 99 weight percent A, preferably 90 to 98 weight percent A, and most preferable 93 to 96 weight percent A, is combined with sufficient B such that the sum of the weight of the A and B ingredients accounts for 100 percent of the total weight of the novel antidegradant ingredient C that is incorporated into a formulation for producing a cured elastomeric article.

The term "elastomeric" is understood to include rubber-like polymers and co-polymers as well as various compositions which have been characterized as "rubber" by those skilled in the art, such as natural rubber, synthetic rubber, and various mixtures of these. The term "elastomeric" thus includes natural rubber, "EPDM," cis-polyisoprene, polybutadiene, styrene-butadiene copolymers, polychloroprene, and acrylonitrile-butadiene copolymers, both by themselves and in various rubber blends. The term "EPDM" is understood to mean an elastomeric terpolymer of ethylene, propylene, and diene monomers. (See , e.g., pages 400–401 of *The Textbook of Polymer Science,* second edition, by F. W. Billmeyer Jr., published 1971 by John Wiley & Son, Inc.) The novel antidegradant ingredient of our invention is preferably used in combination with formulations which include natural rubber.

Additional terms used throughout our specification include the following. The term "compounding" when used in combination with an elastomeric such as rubber shall mean the mixing of various ingredients, possibly including heating, but without the application of pressure. The term "curing" of an elastomeric (usually rubber) compound formulation includes the application of heat and pressure over time. The term "vulcanize" shall mean to modify the properties of an elastomeric such as rubber by treating with sulfur or other additives in the presence of heat and pressure.

Prior to the application of heat and pressure, such a vulcanizable elastomeric material would need to include double bonds, to enable vulcanization of the elastomeric material.

Generally, between about 0.2 and about 8, and preferably between about 2 and 7 parts of sulfur, per one hundred (100) parts by weight of rubber are used.

Elastomeric articles to be protected may be formulated in any conventional manner, along with those compounding ingredients usually also present. For example, vulcanizing agents, accelerators, activators, retarders, antiozonants, plasticizing oils or softeners, and fillers, as well as reinforcing pigments or carbon black may be included in formulations described herein.

The novel antidegradant ingredient of our present invention may be added to those sorts of unsaturated polymers or rubbers, as mentioned above, at a level of from 0.25 to 6 parts-by-weight per one-hundred (100) parts of elastomeric material. A more preferred level is from 0.3 to 5 parts-by-weight antidegradant ingredient per one-hundred (100) parts of elastomeric material. Still more preferably, the level is from 0.5 to 2 parts-by-weight antidegradant ingredient per one hundred (100) parts-by-weight elastomeric material.

Aliphatic ketones which can be used in our present invention are those in which the separate alkyl groups may each contain from 1 to 4 carbon atoms. Suitable examples include acetone, methyl ethyl ketone, methyl propyl ketone, diethyl ketone and methyl butyl ketone.

Primary aromatic amines used in our invention include anilines such as para-ethoxyaniline as well as toluidines and xylidenes, any one of which may be substituted or unsubstituted, including blends of these, wherein the toluidines may further be either of ortho- or meta- structure.

The preferred aliphatic ketone is acetone, and the preferred primary aromatic amine is aniline.

A preferred reaction product of an aliphatic ketone and a primary aromatic amine is a mixture of 2,2,4-trimethyl-1,2-dihydroquinoline monomer, dimer, trimer, and higher molecular-weight components thereof.

For purposes of our present invention, the term "acid anhydride" shall mean that composition which can structurally be represented as having an oxygen atom bonded to two carbonyl carbon atoms.

In this regard, an acid anhydride composition suitable for purposes of our present invention may be depicted as either acyclic or cyclic structurally.

For example, suitable symmetrical acid anhydride compositions which are illustrative and which possess an acyclic structure include acetic anhydride, propionic anydride, n-butyric anhydride, isobutyric anhydride, n-valeric anhydride, n-caproic anhydride, cyclohexane carboxylic anhydride and bis-(3-bromopropanoic) anhydride. (See, for example, pages 226 and 233 of *Organic Chemistry,* 3rd ed., by R. Q. Brewster and W. E. McEwen, published in 1964 by Prentice-Hall Inc. of Englewood Cliffs, N.J., and page 137 of *Nomenclature of Organic Compounds,* by J. H. Fletcher, O. C. Dermer and R. B. Fox, published in 1974 at Washington, D.C., by the American Chemical Society.)

Acid anhydride compositions derived from two molecules of the same monocarboxylic acid are designated "symmetrical" whereas "asymmetrical" acid anhydride compositions are derived from two different monocarboxylic acids. (*Nomenclature of Organic Compounds,* at pages 137–138.)

Asymmetric acid anhydride compositions illustrative of acyclic structure and suitable for purposes of our present invention include acetyl butyrate (also known as acetyl butyryl oxide) and cyclohexane carboxylic propanoic anhydride. (See, for example, page 233 of *Organic Chemistry* by Brewster and McEwen, and page 138 of *Nomenclature of Organic Compounds,* respectively.)

Acid anhydride compositions having cyclic structure are prepared from compositions possessing at least two carboxylic acid moieties. (See, e.g., page 667 of *Organic Chemistry,* 3rd ed., by R. T. Morrison and R. N. Boyd, published in 1976 by Allyn and Bacon Inc. of Boston, Mass.)

In this regard, acid anhydride compositions illustrative of cyclic structure and suitable for purposes of our present invention include succinic anhydride, glutaric anhydride, maleic anhydride, phthalic anhydride and pyromellitic anhydride. (See, e.g., pages 340, 341, 354, 665 and 667, respectively, from *Organic Chemistry,* by Brewster and McEwen.)

Preferred acid anhydrides include maleic anhydride, phthalic anhydride, acetic anhydride, and succinic anhydride.

In preferred methods of preparing the novel antidegradant ingredients of our present invention, "Naugard Q" (trademark or "brand") dihydroquinoline is added to a preferred acid anhydride. ("Naugard Q" is a trademark of Uniroyal Chemical Company, Inc., of Middlebury, Conn., for polymerized 2,2,4-trimethyl-1,2-dihydroquinoline.)

Further in this regard, our preferred acid anhydride is added to "Naugard Q" dihydroquinoline, in which some 1,2-dihydroquinoline monomer may still be present, in an amount of from 3 to 9 weight percent ("wt. %"), based upon "Naugard Q" (brand) polymer.

The amount of monomer present can be adjusted by vacuum or steam stripping the polymer, as is well known, if desired.

The amount of acid anhydride added to 1,2-dihydroquinoline may be from about 3 to 20 wt. %, based upon weight of 1,2-dihydroquinoline and acid anhydride.

Also, a more preferred range may be from 4 to 10 wt. % and a still more preferred range may be from 4 to 7 wt. %, both being present on the above-recited basis.

A method for "tailor-making" a unique antidegradant ingredient, in accordance with various principles of our present invention, contemplates reacting preselected aliphatic ketone and primary aromatic amine reactive ingredients together to produce an antidegradant possessing desired physical properties, and then next adding an acid anhydride to the antidegradant, to produce a mixture.

The mixture can be "finished" in the usual manner, such as flaking.

DETAILED DESCRIPTION OF EXAMPLES

The following examples are set forth to illustrate more clearly, to those skilled in the art, the various principles and practice of this invention.

Yet as such, they are not intended to limit our invention but rather are merely illustrative of general principles as well as various features and advantages of the various preferred embodiments of our present invention.

Example 1

Maleic Anhydride & 1,2-Dihydroquinoline Polymer 40 g of commercially available "Naugard Q" (brand) dihydroquinoline polymer (2,2,4-trimethyl-1,2-dihydroquinoline polymer with less than 3 wt. % monomer present) and 1.6 g of maleic anhydride (commercially available from the Aldrich Chemical Company of Milwaukee, Wis.) were combined in a 50-ml 3-neck roundbottom flask, to produce a mixture. The flask was equipped with a thermometer, a mechanical stirrer, and a nitrogen purge line. The mixture was heated to 140° C. (284° F.) and stirred to effect reaction of the mixture ingredients. The reaction mixture was held at 140° C. (284° F.) for two hours. Thereafter, the reaction product was removed from the flask and flaked. After flaking, the reaction product was ground, bottled, and stored at room temperature, i.e. 25° C. (77° F.), until needed.

The material was subsequently used in the compounding of a rubber article. Following compounding, testing of certain physical properties of the articles took place, with the results being presented in Tables V–VII and X–XII below.

Example 2

Phthalic Anhydride & 1,2-Dihydroquinoline Polymer 40 g of "Naugard Q" dihydroquinoline polymer and 2 g of phthalic anhydride (from Aldrich Chemical Co.) were combined in accordance with procedures set forth in Example 1, the results also being presented in Tables V–VII and X–XII below.

Example 3

Acetic Anhydride & 1,2-Dihydroquinoline Polymer 40 g of "Naugard Q" dihydroquinoline polymer and 2 g of acetic anhydride (from the J T Baker Company of Phillipsburg, N.J.) were combined in accordance with procedures set forth in Example 1, the results also being presented in Tables V–VII and X–XII below.

Example 4

Maleic Anhydride & 1,2-Dihydroquinoline Polymer 20 g of 2,2,4-trimethyl-1,2-dihydroquinoline polymer having a monomer content of 4 to 9 wt. % based on polymer (commercially available from Uniroyal Chemical Company Inc. of Middlebury, Conn.), was combined with 1 g of maleic anhydride (Aldrich) in accordance with procedures set forth in Example 1, except that the reaction hold-time was three hours, the results also being presented in Tables V–VII and X–XII below.

Example 5

Phthallic Anhydride & 1,2-Dihydroquinoline Polymer 40 g of the dihydroquinoline polymer of Example 4 was combined with 3 g of phthallic anhydride (Aldrich) in accordance with procedures set forth in Example 1, the results also being presented in Tables V–VII and X–XII below.

Example 6

Succinic Anhydride & 1,2-Dihydroquinoline Polymer 40 g of the dihydroquinoline polymer of Example 4 was combined with 2 g of succinic anhydride (commercially available from Aldrich) in accordance with procedures set forth in Example 1, and the results are presented in Tables V–VII and X–XII below.

Antidegradant Evaluation Procedure

In each of Examples 1 through 6, confirmation that the amine and anhydride reacted to form an imide was determined by high-performance liquid chromatography. The reaction products of Examples 1 through 6 were tested in a rubber compound, to determine the extent to which they are able to reduce the conversion of insoluble sulfur to a migratable (soluble) form of sulfur, which would otherwise migrate to the surface of an unvulcanized elastomeric (e.g. rubber) article.

To perform our evaluations, we used the following recipe.

TABLE I

Evaluation Recipe

| Ingredients | Parts By Weight |
|---|---|
| elastomer | 200.00 |
| sulfur | 7.50 |
| antidegradant | 2.00 |

The elastomer was cis-4-polybutadiene rubber (commercially available from American Synthetic Rubber of Louisville, Ky.), having a number-average molecular weight of about 139,000 and a weight-average molecular weight of about 315,000.

The sulfur was "Crystex HS 90 OT 20" (brand) polymerized sulfur commercially available from Akzo Chemicals of Chicago, Ill.

The antidegradant was the reaction product of Examples 1–6.

For each of Examples 1 through 6, the ingredients listed above in Table I were mixed together in a "Brabender" (brand) mixer, at an initial mixer internal temperature of 80° C. (176° F.).

The mixer included a cavity portion for containing the mix ingredients, a mixing element disposed within the cavity for mixing the ingredients, and a ram movable within the cavity for causing the ingredients to be brought into contact with the mixing element.

Mixing of the ingredients continued for five (5) minutes or until the mixer internal temperature reached 99° C. (210° F.), whichever occurred first.

For the reaction product of each of Examples 1 through 6, an 8.9 centimeter by 7.6 centimeter (3½ inch×3 inch) 80-gauge plaque was pressed between two sheets of "Mylar" (brand) polyester film (of the same approximate dimensions) for fifteen (15) minutes at a pressure of 2812 kilograms per square centimeter (40,000 pounds of pressure per square inch), at the elevated temperatures of 99° C. (210° F.), 110° C. (230° F.), and 121° C. (250° F.).

The samples thereafter remained at room temperature, i.e. 25° C. (77° F.), for two (2) days.

On the third day, each of the three different-temperature plaque samples for each of Examples 1 through 6 was pressed for seven (7) minutes at 2812 kg/sg-cm (40,000 psi), at 132° C. (270° F.).

Thereafter, the plaque samples were again laid out at room temperature still covered with "Mylar" polyester film.

The plaque surfaces were thereafter visually monitored for fourteen (14) days, on a daily basis, for the appearance of sulfur crystals.

If sulfur crystals have not formed on the plaque surfaces within the two-week period, the general consensus throughout the industry is that any subsequent surface sulfur crystal formation will be negligible.

No surface crystal formation was observed on the plaque samples at the 14-day point, after reaction products of Examples 1–6 were tested as described above.

In the Absence of Prior Reaction

To investigate another aspect of our invention, we added 1.90 parts-by-weight Naugard Q (low monomer content) and 0.10 parts-by-weight maleic anhydride as individual components of the mix, following procedures set forth above, for purposes of evaluating the sulfur conversion test. (Discussed above.) We observed the appearance of sulfur crystals by forty-eight (48) hours.

Without Acid Anhydride

The compounding procedures set forth in Examples 1 through 6 were substantially repeated, except that "Naugard Q" antidegradant was the antidegradant used in compounding a rubber article.

We observed plaque samples for sulfur crystal formation, utilizing dihydroquinoline polymer at the less-than-3 and 4-to-9 wt. % monomer levels, described above, the results being presented below in Table II.

TABLE II

Sulfur Crystal Formation

| Dihydroquinoline Polymer | Crystals Observed By |
|---|---|
| With Less Than 3 Wt. % Monomer | 24th Hour |
| With 4 to 9 Wt. % Monomer | 22nd Hour |

Other Physical Properties of Example 1–5 Reaction Products

In addition to suppressing sulfur crystal formation, other desirable features and advantages of the reaction products of Examples 1 through 5 were investigated. To ensure that the reaction products of each of Examples 1 through 5 performed satisfactorily as antioxidants, the reaction product of each of Examples 1 through 5 was used to prepare a masterbatch utilizing the recipe set forth in Table III. The masterbatch was prepared by mixing twice in the Brabender mixer mentioned above.

For the first mix (see Table III, below, for ingredients), the natural rubber and carbon black were mixed in the mixer for 1.5 minutes.

Thereafter, the zinc oxide, stearic acid, and naphthalenic oil were added and mixed, either until the mixture reached 132° C. (270° F.) or for an additional 3.5 minutes, whichever occurred first.

The mixer was swept at 2.5 and 3.5 minutes, and the batch was discharged subsequently after 5 minutes or when the mixer internal temperature reached 132° C. (270° F.), whichever occurred first. (The term "swept", as used in this paragraph, means to raise the ram above the mixer cavity, sweeping mix ingredients from the ram back into the mixer cavity, to ensure that the mix contains the desired amount of each ingredient.)

TABLE III

Rubber-Compounding Recipe

| Ingredient | Parts-By-Weight |
|---|---|
| Natural Rubber | 100.00 |
| Carbon Black | 58.00 |
| Zinc Oxide | 7.00 |
| Naphthenic Oil | 6.00 |
| Resin | 2.50 |
| Stearic Acid | 2.00 |
| Cobalt Naphthenate | 1.00 |

The natural rubber presented in Table III, known throughout the industry as "SMR 5CV" (brand rubber), is commercially available from Herman Weber Co. Inc. of Chatham, Mass. Cobalt naphthenate is 10 percent cobalt, based on total weight. The resin is a commercially-available resorcinol formaldehyde resin, available from Schenectady Chemicals of Schenectady, N.Y.

The second mix was prepared began by mixing the previous batch for one (1) minute and then adding the cobalt naphthenate and resorcinol formaldehyde resin. The second mix was then discharged either after 5 minutes or when the mixer internal temperature reached 121° C. (250° F.), whichever occurred first.

Typically, the internal temperature constraint is not achieved, and the mix is thus discharged after 5 minutes, often at 104° C. (220° F.).

The masterbatch was next mill-blended for use in the third mix. The resulting product, or stock, was further compounded by mixing according to the recipe of Table IV, which appears below.

TABLE IV

Stock Recipe

| Ingredient | Parts |
|---|---|
| Masterbatch | 176.50 |
| Sulfur (80% oiled) | 6.25 |
| Hexamethoxymethylmelamine | 2.50 |
| Reaction Product of Examples 1–5 | 1.00 |
| N,N-dicyclohexyl-2-benzothiazole sulfenamide | 0.70 |
| Total stock weight | 186.95 |

Mixing of the Table IV ingredients occurred as follows.

First, half the masterbatch ingredients together with the reaction product of each of Examples 1 through 5 were individually added to the mixer, each such addition being followed by the addition of the remainder ingredients of the masterbatch.

After mixing for one minute, the hexamethoxymethymelamine ingredient (available from American Cyanamid of Akron, Ohio), the N,N-dicyclohexyl-2-benzothiazole sulfenamide ingredient, and the sulfur were added to the mix.

Each stock sample was subsequently mixed for an additional three minutes, and the internal temperature of 116° C. (241° F.) was typically reached prior to discharge from the mixer.

The stock samples were thereafter milled, each stock sample at five passes through the mill. (A "pass" is defined as once through the mill rolls.)

Each stock sample was next cured in a 15 centimeter by 15 centimeter (6 inch×6 inch) 75-gauge mold at 160° C. (320° F.), at a pressure of 2812 kg/sq-cm (40,000 psi).

The cure time was defined as "the amount of time required to achieve 90% cure, plus 2 minutes".

"Shore A" hardness, tensile strength, 100 to 300% modulus, and percent elongation of each of the thus-cured stock samples was subsequently evaluated at three aging levels: unaged, 2 days at 100° C. (212° F.) in a hot air circulating oven, and 4 days at 100° C. (212° F.) in a hot air circulating oven.

Results are tabulated in Tables V through VII below for the novel antidegradant ingredients of Examples 1 through 5; and such results are compared to unreacted Naugard Q (only) antidegradant, the otherwise "standard" antidegradant.

TABLE V

Unaged Physical Properties

|  | TMQ | Ex 1 | Ex 2 | Ex 3 | Ex 4 | Ex 5 |
|---|---|---|---|---|---|---|
| 300% modulus, psi | 2820 | 2940 | 2780 | 2700 | 2670 | 2700 |
| Tensile strength, psi | 3310 | 3190 | 3220 | 3190 | 3270 | 3310 |
| Elongation, % at Break | 360 | 320 | 360 | 350 | 390 | 360 |
| Hardness, Shore A | 80 | 83 | 81 | 82 | 81 | 82 |

TABLE VI

Physical Properties, Aged 2 Days @ 100° C.

|  | TMQ | Ex 1 | Ex 2 | Ex 3 | Ex 4 | Ex 5 |
|---|---|---|---|---|---|---|
| Tensile Strength, % Retention | 29 | 32 | 30 | 31 | 28 | 27 |
| Elongation, % Retention | 22 | 25 | 19 | 23 | 21 | 19 |
| Hardness, Delta | +3 | +2 | +6 | +4 | +5 | +6 |

TABLE VII

Physical Properties, Aged 4 days @ 100° C.

|  | TMQ | Ex 1 | Ex 2 | Ex 3 | Ex 4 | Ex 5 |
|---|---|---|---|---|---|---|
| Tensile Strength, % Retention | 24 | 25 | 25 | 25 | 14 | 23 |
| Elongation, % Retention | 17 | 16 | 17 | 17 | 10 | 11 |
| Hardness, Delta | +3 | +4 | +6 | +3 | +4 | +5 |

Notes for Tables V–VII

TMQ is commercially-available poly (1,2-dihydro-2,2,4-trimethyl quinoline) having about 4 to 9 wt. % monomer present.

Tensile strength and elongation values of Tables VI and VII, both expressed as percent (%) values, are each dimensionless because each is formed of a ratio, each such ratio being the final tensile strength or elongation value divided by the original value, this ratio next being multiplied by one hundred (100), to arrive at the dimensionless percentage value presented above in Tables VI and VII.

The "Delta" value presented above is determined by subtracting the unaged hardness value (presented above in Table V) from the aged hardness value which we determined.

The reaction product of Example 6 was not included in these evaluations.

Second Evaluation

To further verify the antidegradant performance qualities of the reaction products of our present invention, a second group of evaluations were performed.

In this second set of evaluations, the sulfur level used was more moderate (i.e. lesser in amount) and the aging conditions less severe than the first set of evaluations.

In the masterbatch recipe (of the second set of evaluations), cobalt naphthenate, hexamethoxymethylmelamine, and resorcinol formaldehyde resin were eliminated, and the sulfur level was reduced to 2.50 parts by weight, as compared to 6.25 parts by weight as set forth in Table IV, and the agings were twenty-four (24) hours at 100° C. (212° F.) and 2 weeks at 70° C. (158° F.), rather than two (2) and four (4) days at 100° C. (212° F.).

For the second evaluation, the recipe used is set forth below in Table VIII.

TABLE VIII

Rubber-Compounding Recipe

| Ingredient | Parts |
|---|---|
| Natural Rubber | 100.00 |
| Carbon Black | 58.00 |
| Zinc Oxide | 7.00 |
| Naphthenic Oil | 6.00 |
| Stearic Acid | 2.00 |

Rubber identified in Table VIII is described above in connection with Table III.

Half the rubber, all of the carbon black, all of the zinc oxide, all of the stearic acid, and all of the naphthenic oil, were sequentially combined, with the remaining rubber thereafter being incorporated into the mix.

The resultant mixture was next mixed using the same equipment mentioned in regard to Table I. The mixer was swept twice, namely once at 2.5 minutes and once again at 3.5 minutes.

The batch was discharged either after 5 minutes or when the mixer reached an internal temperature of 149° C. (300°) F., whichever occurred first. The temperature constraint was usually met first.

The batch was next mill-mixed, and thereafter cut for use in the stock recipe set forth in Table IX below.

TABLE IX

Second Stock Recipe

| Ingredient | Parts |
|---|---|
| Masterbatch | 173.00 |
| Sulfur (80% oiled) | 2.50 |
| Reaction Product of Examples 1–5 | 1.00 |
| N,N-dicyclohexyl-2-benzothiazole sulfenamide | 0.70 |
| Total stock sample weight | 177.20 |

The stock samples of the second evaluation were mixed in a fashion similar to mixing procedures described above for the stock samples of the first evaluation and thereafter similarly cured.

The same physical properties were measured and presented in Tables X through XII, below, along with the "agings," which were as follows: unaged, twenty-four (24) hours at 100° C. (212° F.) and two (2) weeks at 70° C. (158° F.).

The results presented in Tables X through XI clearly show that the antidegradant properties of the compounds of our present invention are comparable to the antidegradant properties of a well-known commercial and widely-used rubber antidegradant.

TABLE X

Unaged Physical Properties

|  | TMQ | Ex 1 | Ex 2 | Ex 3 | Ex 4 | Ex 5 |
|---|---|---|---|---|---|---|
| 300% Modulus, psi | 1950 | 1780 | 1880 | 1930 | 1790 | 1920 |
| Tensile Strength, psi | 3660 | 3470 | 3410 | 3530 | 3390 | 3430 |
| Elongation, % at Break | 500 | 500 | 470 | 480 | 490 | 480 |
| Hardness, Shore A | 68 | 67 | 67 | 67 | 67 | 68 |

TABLE XI

Physical Properties, Aged 24 hours at 100° C.

|  | TMQ | Ex 1 | Ex 2 | Ex 3 | Ex 4 | Ex 5 |
|---|---|---|---|---|---|---|
| 300% Modulus, % Retention | 136 | 142 | 132 | 133 | 136 | 133 |
| Tensile str, % Retention | 98 | 98 | 92 | 99 | 100 | 96 |
| Elongation, % Ret | 82 | 80 | 77 | 85 | 82 | 81 |
| Hardness, Delta | +4 | +3 | +4 | +5 | +3 | +3 |

TABLE XII

Physical Properties, Aged 2 weeks at 70° C.

|  | TMQ | Ex 1 | Ex 2 | Ex 3 | Ex 4 | Ex 5 |
|---|---|---|---|---|---|---|
| 300% Modulus, % Retention | 133 | 144 | 126 | 126 | 134 | 124 |
| Tensile str, % Retention | 84 | 85 | 83 | 80 | 80 | 82 |
| Elongation, % Ret | 70 | 66 | 72 | 71 | 67 | 71 |
| Hardness, Delta | +3 | +3 | +4 | +4 | +4 | +3 |

Notes to Tables XI and XII (1) Tensile strength and elongation percentage values as well as hardness "Delta" values were determined as discussed above in connection with Tables V and VII.

(2) The 300% modulus percentage value presented in Tables XI and XII is determined by forming a ratio, such ratio being the final 300% modulus value divided by the original value, this ratio next being multiplied by one hundred (100), to arrive at the dimensionless 300% modulus percentage values presented above in Tables XI and XII.

Described above is an invention relating to rubber compounding.

While our invention has been described with reference to preferred embodiments and examples, it will be clear to those who are skilled in the rubber-compounding area of technology that our invention is not to be limited either to the preferred embodiments or to the particular examples presented above.

For example, one skilled in the art of organic chemistry and having the benefit of this disclosure would know that not only benzoic anhydride but also the anhydride of cis-cyclopentane-1,2-dicarboxylic acid are examples of acid anhydrides having those sorts of acyclic symmetrical and cyclic structures which would be suitable for purposes of our present invention. (See, e.g., page 659 from the Morrison and Boyd *Organic Chemistry* text and page 355 from the Brewster and McEwen *Organic Chemistry* text, respectively.)

Accordingly, various changes, modifications, alternatives and functional equivalents will become apparent to those skilled in the relevant prior art upon reading our patent specification.

It is to be understood, therefore, that such changes, modifications, alternatives and functional equivalents are to be considered as forming a part of our invention insofar as they fall within the spirit and scope of the following claims.

We claim:

1. In a formulation which includes insoluble sulfur, the improvement which comprises an effective amount of a reaction product in the formulation, wherein the reaction product is produced by combining:

(A) a first reactive ingredient, itself produced by reactively combining an aliphatic ketone with a primary aromatic amine, and (B) a second reactive ingredient, which is an acid anhydride, wherein the reaction product is present in the formulation in an amount that is effective for reducing the rate at which insoluble sulfur converts to a migratable form of sulfur.

2. The improved formulation of claim 1 wherein the aliphatic ketone is acetone and the primary aromatic amine is aniline.

3. The improved formulation of claim 1 wherein the first reactive ingredient is a mixture of 2,2,4-trimethyl-1,2-dihydroquinoline monomer, dimer, trimer, and higher molecular-weight components thereof.

4. The improved formulation of claim 1 wherein the acid anhydride is either maleic anhydride, phthalic anhydride, acetic anhydride, or succinic anhydride.

* * * * *